United States Patent [19]

Chao

[11] Patent Number: 4,740,536

[45] Date of Patent: Apr. 26, 1988

[54] WATER-BASED BINDER, COATING AND ADHESIVE COMPOSITIONS FROM ALKALINE-CURABLE LATEX POLYMERS, EPOXIES AND AMINES

[75] Inventor: Yen-Yau H. Chao, Collegeville, Pa.

[73] Assignee: Rohm and Haas Company, Philadelphia, Pa.

[21] Appl. No.: 773,399

[22] Filed: Sep. 6, 1985

[51] Int. Cl.$^4$ .......................... C08K 3/20; C08J 23/00; C08J 89/00; C08F 26/00

[52] U.S. Cl. .................................. 523/406; 523/400; 523/402; 523/409; 524/270; 524/271; 524/272; 524/273; 524/499; 524/501; 524/502; 524/508; 524/519; 526/312

[58] Field of Search ............... 523/402, 400, 406, 409; 524/270–273, 499, 501, 502, 508, 519; 526/312

[56] References Cited

U.S. PATENT DOCUMENTS

| | | | |
|---|---|---|---|
| 3,678,098 | 7/1972 | Lewis et al. | 526/288 |
| 3,702,799 | 11/1972 | Lewis et al. | 162/168 |
| 3,862,068 | 1/1975 | Russell | 524/271 |
| 3,901,857 | 8/1975 | Sackman et al. | 526/312 |
| 3,970,623 | 7/1976 | Feeney et al. | 526/66 |
| 4,120,839 | 10/1978 | Emmons et al. | 524/606 |
| 4,138,446 | 2/1979 | Kawakami et al. | 524/271 |
| 4,200,562 | 4/1980 | Yoshioka et al. | 524/271 |
| 4,215,028 | 7/1980 | Mizuguchi et al. | 526/312 |
| 4,404,299 | 9/1983 | Decroix | 524/272 |
| 4,438,232 | 3/1984 | Lee | 524/273 |
| 4,478,993 | 10/1984 | Wideman et al. | 524/271 |
| 4,532,273 | 7/1985 | Kadowaki et al. | 523/402 |

FOREIGN PATENT DOCUMENTS 0072158 2/1983 European Pat. Off. .

OTHER PUBLICATIONS

Webster's New World Dictionary, College Edition, World, (N.Y.) 1966, p. 496.

Primary Examiner—Harold D. Anderson
Assistant Examiner—Dennis R. Daley
Attorney, Agent, or Firm—Carl W. Battle

[57] ABSTRACT

This invention relates to ambient-curing water-based binder, coating and adhesive compositions. These compositions are prepared by mixing (1) an acidic first component containing an aqueous dispersion of polymer latex, said polymer being alkali-curable and polymerized from a monomer mixture containing quaternary ammonium monomer, and an epoxy resin, together with (2) an alkaline second component containing an amine curing reagent. The resulting mixture of the first and second components is alkaline, cures quickly at room temperature, and yields films with high film strength, durability, and excellent heat and water resistance.

29 Claims, No Drawings

WATER-BASED BINDER, COATING AND ADHESIVE COMPOSITIONS FROM ALKALINE-CURABLE LATEX POLYMERS, EPOXIES AND AMINES

BACKGROUND OF THE INVENTION

Curing of epoxies by amines at ambient and elevated temperatures is well known in the coating and adhesive arts. In structural bonding, most two-part epoxies are known to lack immediate bond strength; clamps and other fixing devices must be used to hold laminates until cured. In addition, many cured epoxies are known to be quite brittle. To toughen the epoxy matrix, many rubbery materials, such as carboxyl-terminated or acrylate-terminated butyl nitrile elastomers, have been incorporated. Elevated temperatures are usually needed for a toughening reaction to take place with these elastomer-modified materials. To achieve both film toughness and immediate bond strength through room temperature cure, the present invention describes the modification of a curable rubbery material by adding, as minor components, amine and epoxies.

U.S. Pat. No. 3,905,931 describes a curable, aqueous emulsion adhesive composition where a carboxyl-functional copolymer was blended with an epoxy resin to achieve water-resistant adhesive bonding. The '931 patent specifically describes a blend of an aqueous emulsion of poly(ethyl acrylate), an aqueous emulsion of ethyleneacrylic acid copolymer and epoxy resin. Similarly, U.S. Pat. No. 4,029,620 describes a thermally curable aqueous emulsion coating composition based on a blend of carboxylfunctional copolymer, amine, and epoxy resin. And in U.S. Pat. No. 4,342,843 a heat and water resistant latex adhesive is described based on a blend of an acid-containing neoprene latex, a polyamine and epoxy resin. However, it is well known in the art that the rate of curing acid-functional groups by epoxies is slow in aqueous environment; elevated temperatures are often needed to accelerate curing. The compositions of the present invention contain a room temperature-curable polymer latex modified with amine and epoxy additives. In contrast to the prior art, these compositions cure readily at room temperature in a few days. These compositions are prepared by mixing (1) an acidic first component containing an aqueous dispersion of polymer latex, said polymer being alkali-curable and polymerized from a monomer mixture containing quaternary ammonium monomer, and an epoxy resin, together with (2) an alkaline second component containing an amine curing reagent. The resulting mixture is alkaline, cures quickly at room temperature, and yields films with high film strength, durability, and excellent heat and water resistance.

U.S. Pat. Nos. 3,678,098 and 3,702,799 describe latex polymers containing room-temperature-curable quaternary ammonium halide functional groups. EPC Publication No. 0072158 further discloses quaternary ammonium functional monomers having surfactant anions ("liposalts") and aqueous dispersions of latex polymers prepared therefrom. The quaternary ammonium functional groups are stable at acidic pH's. They become self-reactive at alkaline pH and the polymers containing these functional groups crosslink themselves at room temperature. However, due to the polymeric nature of the material and the use of less effective simple bases, the quaternary ammonium group-containing latex polymer cures relatively slow at room temperature and the final degree of crosslinking is extremely limited. In contrast, the compositions of the present invention incorporate the more effective amines and epoxies into the quaternary ammonium group-containing latex polymers. The novel polymer mixtures of this invention cure readily at room temperature and generate much higher film strength, heat and water resistance than the alkaline-curable polymer latices described in U.S. Pat. No. 3,702,799.

SUMMARY OF THE INVENTION

The present invention provides binder, adhesive and coating compositions which are curable at room temperature and which yield cured films which exhibit superior film strength, improved durability, and excellent heat and water resistance in comparison with prior art compositions. Compositions of this invention include, but are not limited to, a two-part, room-temperature-curable binder, coating and adhesive composition having (1) a first component containing an alkaline-curable latex polymer and an epoxy resin and (2) a second component containing an amine curing reagent. The invention also includes the mixture of these two components and the cured adhesive, coating or binder derived from this mixture. In a third embodiment this invention comprises an acidified mixture of an alkaline-curable latex polymer, an epoxy and an amine resin. Such polymer latices and mixtures are stable at acidic pH and become self-reactive with the addition of base. A fourth embodiment of this invention comprises a two-part system wherein the first component comprises a latex polymer blend containing alkaline-curable latex polymer, carboxylic acid latex copolymer, and epoxy resin; and the second component contains an amine resin and an organic base or an inorganic base, or their mixture. All four of these embodiments of this invention yield binders, coatings and adhesives which have high film strength, durability, and excellent heat and water resistance. Each of the embodiments of the present invention can be generally described as an improved aqueous binder, coating, or adhesive composition essentially comprising (1) an aqueous dispersion of an alkaline-curable, thermosetting latex polymer prepared by emulsion polymerization and containing pendant and/or terminal quaternary ammonium groups selected from those of the formula

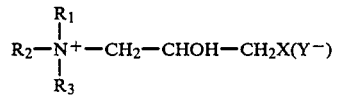

and

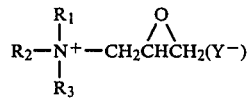

wherein
$R_1$ is an ethylenically unsaturated organic group
$R_2$ and $R_3$ are independently $C_1$-$C_6$ alkyl groups;
X is Cl, Br, I, or functionally equivalent groups;
Y is any anion, such as a halogen ion ($Cl^-$, $Br^-$, or $I^-$) or the anion of any other acid, such as nitrate, phosphate, acid phosphate, sulfate, bisulfate, methyl sulfate, carboxylate, sulfonate, sulfamate, acetate, formate, oxalate, acrylate, and α-methacryloxyacetate, (2) at least one epoxy compound having two or more epoxy groups per molecule; and (3) amine-functional epoxy curing agent.

DETAILED DESCRIPTION OF THE INVENTION

The present invention relates to improved aqueous binder, coating or adhesive compositions essentially (1) an aqueous dispersion of an alkaline-curable, thermosetting latex polymer or copolymer prepared by emulsion polymerization of monoethylenically unsaturated acid, acid esters, and vinyl monomers, and containing pendant and/or terminal quaternary ammonium groups selected from those of the formula

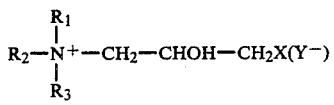

and

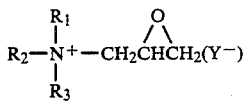

wherein
R$_1$ is an ethylenically unsaturated organic group
R$_2$ and R$_3$ are independently C$_1$-C$_6$ alkyl groups;
X is Cl, Br, I, or functionally equivalent groups;
Y is any anion, such as a halogen ion (Cl$^-$, Br$^-$, or I$^-$) or the anion of any other acid, such as nitrate, phosphate, acid phosphate, sulfate, bisulfate, methyl sulfate, carboxylate, sulfonate, sulfamate, acetate formate, oxalate, acrylate, and α-methacryloxyacetate, (2) at least one epoxy compound having two or more epoxy groups per molecule; and (3) amine-functional epoxy curing agent.

The compositions of this invention may be formulated as a one-part or two-part system.

Because the quaternary ammonium groups are self-reactive at alkaline pH, it is preferred that the pH of the compositions be less than 7. When the pH of these compositions is raised, as by the addition of a strong base such as sodium hydroxide, or a basic salt such as sodium bicarbonate or sodium sesquicarbonate, the latex polymer in time becomes crosslinked. In practice the pH of the composition will be raised shortly before application, so that the compositions may be applied as an adhesive, coating or binder, and film formation can occur before a substantial amount of crosslinking takes place.

The preferred embodiment of the present invention relates to a two-component system. This two-part binder, coating or adhesive composition essentially comprises (1) a first component comprising (a) an aqueous dispersion of an alkaline-curable, thermosetting latex polymer prepared by emulsion polymerization and containing quaternary ammonium groups as described above and (b) at least one epoxy compound having two or more epoxy groups per molecule; and (2) a second component comprising amine-functional epoxy curing agent, an organic base which contains no amine functional groups, an inorganic base, or a mixture thereof; wherein the pH of the mixture of said first and second components is greater than about 6. Preferably, the pH of the mixture of these first and second components is greater than about 7. It is especially preferred that the pH of the mixture be from about 8.5 to about 11.

Preferably, R$_1$ of the quaternary ammonium group is

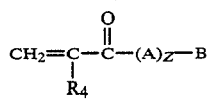

wherein
A is —O—, —NH— or —N(CH$_3$)— with Z being 0 or 1;
B is —(CH$_2$)$_n$— with n being 2–4, or B is a polyoxyalkylene group of formula —(CH$_2$CH$_2$O)$_x$CH$_2$CH$_2$— with x being 1 to 11;
and R$_4$ is —H or —CH$_3$.
R$_1$ is also preferably

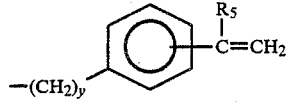

wherein R$_5$ is —H or —CH$_3$; and y is 1 to 4.
More preferably, R$_1$ is, R$_5$—CH$_2$—(CHR$_6$)$_n$—CH$_2$—
wherein
R$_5$ is an alkenoxy group containing an allyl group or a carbalkenoxy group containing a double bond functionally equivalent to an isolated vinyl group (i.e., free-radical-polymerizable double bond);
R$_6$ is —H or —OH; and
n=0 or 1.

The characteristics and preparation of the alkaline-curable, thermosetting latex polymers useful in the compositions of the present invention are disclosed in detail in U.S. Pat. Nos. 3,678,098 and 3,702,799, which are herein incorporated by reference. The alkaline-curable, thermosetting latex polymers may be obtained by emulsion polymerization of monomer mixtures comprising one or more copolymerizable monomers containing of least one quaternary ammonium group as described above.

The quaternary ammonium group-containing latex polymers may also be prepared by reacting an epihalohydrin with a polymer containing an amine of the formula

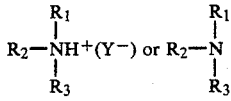

wherein R$_1$, R$_2$ and R$_3$ are as hereinbefore described.

The anion (Y$^-$) of the quaternary ammonium group may be an inorganic anion such as halogen ion (Cl$^-$, Br$^-$, or I$^-$) or the anion of any other acid, such as nitrate, phosphate, acid phosphate, sulfate, bisulfate, methyl sulfate, carboxylate, sulfonate, sulfamate, acetate, formate, oxalate, acrylate, and alpha-methacryloxyacetate. Preferably, (Y$^-$) is the anion of an acid having an ionization constant (pKa) of 5.0 or less (i.e., a dissociation such that the hydrogen ion concentration is at least $10^{-5}$). This anion may also be an organic anion, including a surfactant anion which is surface active in water; that is, it can be an anion which concentrates at the air-water interface and thereby lowers the surface tension of the water. Many such anions (i.e., the anionic portion of an "anionic surface active agent") are known to those skilled in this art. Among the classes of surfactant anions that are useful in this invention are those given in the classification scheme on pages 15 and 16 of Schwartz and Perry, *Surface Active Agents*, Interscience Publishers, 1949.

As used herein, the term "surfactant anion" embraces mixtures of surfactant anions, including commercial materials which often are mixtures of species varying in hydrocarbyl chain length. Among the useful surfactant anions are those which are relatively hydrophilic in the hydrophile-lipophile balance ("HLB") classification of surfactants.

Many types of anionic surfactants are known, and are generally classified by the chemical nature of the anion. Particularly useful examples are the sulfuric esters of sulfates joined directly or through an intermediate linkage to a hydrophobic group; alkane sulfonic acids with the sulfonic or sulfonate linked directly to a hydrophobe or linked through an intermediate linkage such as an ester or an amide or ether linkage; alkyl aromatic sulfonic acids again either directly or indirectly linked; phosphates or phosphonic acids; thiosulfates; sulfonamides; sulfamic acids and the like. Preferred anions are alkyl sulfates having an alkyl group of 6 to 20 carbon atoms, such as lauryl and myristyl sulfates; aromatic sulfonates of 8 to 24 carbon atoms, such as dodecylbenzenesulfonate; alkyl and alkaryl oxyethylene sulfates having up to 10 oxyethylene units, wherein the alkyl group has at least 8 carbons and may have up to a number corresponding to 20 plus the number of oxyethylene units in the anion; and dialkyl sulfosuccinates having a total of 6 to 30 carbon atoms in the two alkyl groups. The most preferred anions are dodecylbenzenesulfonate, lauryl sulfate, myristyl sulfate, tridecyl sulfate, dioctyl sulfosuccinate, diisobutyl sulfosuccinate and dioctyl phosphate. The various anionic surfactants are usually commercially available as alkali metal salts, ammonium salts or salts of low molecular weight amines.

Mixtures of inorganic and organic anions may also be employed. Examples of such mixtures include nitrates and halides such as chloride with dodecylbenzene sulfonate, and other surfactant anions such as the anions of Gafac 960, (Gafac 960 is a phosphate soap from GAF Corp., N.Y., N.Y.).

The quaternary ammonium monomers used in the present invention are copolymerized with other polymerizable, ethylenically unsaturated monomers by emulsion polymerization procedures. Any known polymerization initiator of free radical type effective in aqueous systems can be used. Examples are t-butyl hydroperoxide, ammonium persulfate, and alkali metal persulfates, such as those of sodium or potassium. These may be employed in the proportions customary in the emulsion polymerization art, such as from about 0.1 to 2% based on weight of monomer. In redox systems, sodium hydrosulfite or other reducing agents may also be used together with the initiators described above.

Any of a wide variety of emulsifiers or mixtures thereof known to those skilled in the art may be used to prepare the latex compositions of this invention. Preferably nonionic or cationic emulsifiers are used for the emulsion polymerization for these quaternary ammonium group-containing monomers, which are salts of strong acids. However, in the case of liposalt quaternary ammonium monomers, anionic or nonionic emulsifiers may be used.

Emulsion polymerization procedures are particularly effective for polymerization of liposalt quaternary ammonium monomers. As emulsifiers in the emulsion polymerization, any of the commonly used nonionic surfactants may be employed, such as the alkyl phenyl polyethoxy ethanols having from about 10 to 50 or more oxyethylene units, and any of the anionic surfactants, preferably the species hereinbefore described. The use of comparatively inexpensive anionic surfactants as emulsifiers with the quaternary ammonium liposalt monomers distinguishes these monomers from strong base salt quaternary monomers. Strong base salt monomers, not being liposalts, are generally employed with nonionic surfactants or cationic surfactants. The anionic surfactant stabilized emulsion polymers containing quaternary ammonium liposalts can, of course, be mixed with known commercial anionically stabilized emulsion polymers to achieve specific properties.

Any ethylenically unsaturated monomer having a group

may be used for copolymerization with the quaternary ammonium monomers under conditions such that the polymerization medium is maintained at an acid condition, preferably at a pH of less than 6. Examples of monoethylenically unsaturated monomers having a single

group include vinyl esters of ($C_1$-$C_{18}$) aliphatic acids, such as vinyl acetate, laurate, and stearate; esters of acrylic acid or methacrylic acid with ($C_1$-$C_{18}$) alcohols, including ($C_1$-$C_{18}$)alkanols, benzyl alcohol, cyclohexyl alcohol, and isobornyl alcohol, such as methyl acrylate or methacrylate, ethyl acrylate or methacrylate, butyl acrylate or methacrylate, or 2-ethyl hexyl acrylate or methacrylate, octadecyl acrylate or methacrylate; vinyl aromatic hydrocarbons (e.g., styrene, isopropenyl toluene, and various dialkyl styrenes); acrylonitrile, methacrylonitrile, ethacrylonitrile, and phenylacrylonitrile; acrylamide, methacrylamide, ethacrylamide, N-methylol acrylamide, N-monoalkyl and -dialkyl acrylamides and methacrylamides (e.g., N-monomethyl, -ethyl, -propyl, -butyl, and N-dimethyl, -ethyl, -propyl, -butyl, etc. alkacrylamides, and N-monophenyl- and -diphenyl -acrylamides and methacrylamides); vinyl ethers, such as butyl vinyl ether; N-vinyl lactams such as N-vinyl pyrrolidone; and olefins, such as ethylene; fluorinated vinyl compounds, such as vinylidene fluoride; 2-hydroxyethyl acrylate or methacrylate or any of the hydroxyl-containing or amine-containing monomers; vinyl chloride and vinylidene chloride; alkyl vinyl ketones; itaconic diesters containing a single

grouping (e.g., the dimethyl, diethyl, dipropyl, dibutyl and other saturated aliphatic monohydric alcohol diesters of itaconic acid, diphenyl itaconate, dibenzyl itaconate, di(phenylethyl)itaconate; allyl and methallyl esters of saturated aliphatic monocarboxylic acid, such as, allyl and methallyl acetates, allyl and methallyl propionates, allyl and methallyl valerates; vinyl thiophene; 4-vinyl pyridine; and vinyl pyrrole.

It is also possible to produce quaternary ammonium-containing homopolymers and/or copolymers of the liposalt quaternary monomers with the quaternary monomers which are salts of strong bases.

In identifying suitable vinyl monomers for reaction with the quaternary ammonium liposalt and strong base salt monomers care should be paid to the reactivity ratios of the monomers and/or to the Q and e values as determined in accordance with Alfrey-Price Qe scheme. It is preferred to copolymerize the quaternary ammonium monomers with monomers having similar relative reactivity ratios as taught by C. Walling in *Free Radicals in Solution*, John Wiley, 1957, Chapter 4 and Bandrup and Immerget et al., *Polymer Handbook*, John Wiley, 1975, Section II, n.b. pages 249–257. Utilizing this type of information, a proper choice of embodiment of quaternary ammonium monomer can be made from its expected relative reactivity ratios $R^1$ and $R^2$ and similarly for the vinyl monomers. It is preferred that the relative reactivity ratios of the liposalt monomer and the comonomers should be greater than zero and should differ no more than a factor of 10. Additionally the Q and e values of the quaternary ammonium liposalt monomer should be similar to those of the vinyl monomers used to form a copolymer.

The quaternary ammonium monomers can be homopolymerized, but advantages in their use are obtained in copolymerization which employs the excellent organic phase solubility characteristics of these monomers.

Among the preferred monomers used with the quaternary ammonium liposalt monomers are acid and acid anhydride monomers. Usually the use of anionic acid monomers in copolymerization with cationic quaternary ammonium monomers is avoided; however, in the present case involving liposalt containing polymers, these acid and acid anhydride monomers yield the preferred polymer compositions. Preferably the amount of acid comonomer employed is less than or about equal to the amount of quaternary ammonium monomer, on a molar basis, although a molar excess of acid may be used in some instances. The acids may be any of the alpha, beta-unsaturated acids, such as the monocarboxylic acids, preferably acrylic, methacrylic, beta-acryloxypropionic, and mixtures of beta-acryloxypropionic with the higher Michael addition oligomers of acrylic acid, crotonic and half esters of maleic and fumaric, with acrylic and methacrylic being most preferred; as well as polycarboxylic acids such as maleic, fumaric and, preferably, itaconic. The quaternary ammonium liposalt monomer content is, by weight, usefully up to 100% of the total monomer, with the ranges 90 to 100% and 0.2 to 50% being preferred, 0.5 to 10% more preferred, and 1 to 5% most preferred. The carboxylic acid monomer content is preferably up to 5% by weight of total monomer, more preferably 0.1 to 1%.

In addition to the alkaline-curable, thermosetting latex polymer containing quaternary ammonium groups, compositions of the present invention may additionally contain an aqueous dispersion of a carboxylic acid latex polymer prepared by emulsion polymerization of at least one monomer having pendant carboxylic acid. Carboxylic acid-functional latex polymers are well known in the art; the preparation of such latex polymers is discussed, for example, in H. Warson's, *The Applications of Synthetic Resin Emulsions*, Chapter 12 (Ernest Benn Ltd, London 1972). The practice of emulsion polymerization is discussed in detail by D. C. Blackley, *Emulsion Polymerization* (Wiley, 1975). It is preferred that the carboxylic acid polymers be prepared from comonomer selected from acrylic acid, methacrylic acid, itaconic acid, crotonic acid, maleic acid, fumaric acid, beta-acryloxypropionic acid, mixtures of beta-acryloxypropionic acid with the higher oligomers of acrylic acid, and mixtures thereof. Comonomers which may be employed in preparing carboxylic acid functional latex polymers are those which may be copolymerized with quaternary ammonium monomers as discussed above, but may additionally include comonomers such as ethylene, butadiene and the like. For example, an ethylene/acrylic acid latex copolymer, such as disclosed in U.S. Pat. No. 3,905,931, may be employed.

The epoxy resins used in the compositions of this invention include any resin containing two or more epoxy functional groups. Preferred epoxy resins are reaction products of bisphenol A or bisphenol F and epichlorohydrin, epoxidized novolac resins formed by reaction of epichlorohydrin with the reaction product of phenol (or substituted phenols) and formaldehyde; reaction products from epichlorohydrin and an aliphatic polyol such as glycerol, 1,4-butanediol, poly(oxypropylene) glycol or similar polyalcoholic components, and resins obtained by epoxidation with peracetic acid. Mixtures of such resins may also be employed. In the two-part compositions of this invention these epoxy resins, either in liquid form, in solution state or in emulsified form (in water), can be blended directly into the aqueous dispersion of latex polymer. The epoxy resin is combined with the latex copolymer in an amount from about 0.1 to 50% based on the dry weight of the latex copolymer. Preferred compositions have the epoxy resin in an amount of from about 0.2 to 20% based on the dry weight of the latex copolymer.

Virtually any polyfunctional amine containing active hydrogens as a primary or secondary substituent may be employed in this invention, although water emulsifiable and water soluble amines are preferred. Other conventional, non-amine-containing epoxy curing reagents may additionally be used. The most preferred amines are ethylene diamine, diethylene triamine, triethylene tetramine, polyoxypropylene amines such as Jefferson Chemical's Jeffamine D-230, amine functional acrylic resins such as disclosed in U.S. Pat. No. 4,120,839, isophorone diamine and tetraethylene pentamine. Organic solvents such as Texanol, cellosolves, or emulsifiers may be employed with some of the water insoluble amines.

Accelerators for epoxy curing can also be used together with the amine curing reagent. Preferred accelerators are tri-(dimethylaminomethyl) phenol, dimethylaminomethyl phenol and aminoethyl piperazine. They are typically used in an amount of from about 0.01 to 10 based on the weight of the epoxy resin.

The invention has thus far been described in the preferred embodiment of a two-part system comprising (1) polymeric latex containing quaternary ammonium groups and epoxy and (2) amine curing agent. However, alkaline-curable polymer compositions such as disclosed in U.S. Pat. No. 3,702,799 are stable at acidic pH. This stability makes an alternative embodiment of the present invention possible. In this alternate embodiment, both amine and epoxy are mixed with the alkaline curable latex polymer as a one-part composition, and an organic or inorganic acid is added to keep the emulsion at acidic pH. Curing of this acidic polymer-/amine/epoxy mixture is accomplished by adjusting the emulsion pH to greater than 6 with an organic or inorganic base.

Still another embodiment of the present invention is the cured polymer blend (mixture of first and second components) which may be employed as a one-part, high performance coating or adhesive. Films cast from such cured polymer latices have high strength and show very good adhesion to various metal, wood and plastic materials. To prevent hardening or gelation of such cured latices, the total amount of the curable quaternary ammonium functional group in the latex polymer should be less than 10% by weight. Although the latex polymer used in the first component of the two-part composition of this invention must contain an alkaline curable quaternary ammonium monomer, other latex polymers which have no such functional monomer, but are able to participate in the curing reaction with the quaternary ammonium functional groups, can also be added to the first component of this invention. An example of such an alkaline curable polymer/polymer blend is described in U.S. Pat. No. 4,420,583. The compositions described in the '583 patent are a blend of a carboxylic acid copolymer and a quaternary ammonium containing polymer. The blend, after activation by base will crosslink to an insoluble alloy polymer. Such polymer/polymer latex blends can also be used as base polymer in the first component of the present invention and achieve the enhanced performance by the addition of the second component containing amine resin.

Various additives can be added into the polymer latex in the first component or the two-part mixtures of this invention. The additives can be rheological modifiers, thickeners, tackifiers, pigments, dyes, fillers, plasticizers, metals, metal oxides, solvents, preservatives, defoamers, stabilizers, antioxidants, corrosion inhibitors and the like.

When the compositions of this invention are used as coating material, improvement in film tensile strength and toughness are observed over the control polymer emulsion without the epoxy and amine additives. In non-woven binder applications, the compositions of this invention give the fabric much greater wash durability over the control polymer emulsion. In adhesive applications such as bonding automotive interior trims, metal/honeycomb/metal sandwich structures in construction industry, electric circuit laminates, etc., the compositions of the present invention show greatly improved initial and cured bond strength, excellent heat and humidity resistance, and good adhesion to various plastic, wood, glass, and metal substrates.

The present invention is further illustrated by, but not limited to, the following preparations and examples. The quaternary ammonium and other monomers are abbreviated in the examples below as follows:

| Abbreviation | Monomer |
|---|---|
| EA | ethyl acrylate |
| BA | butyl acrylate |
| AN | acrylonitrile |
| MMA | methyl methacrylate |

| Abbreviation | Monomer |
|---|---|
| AA | acrylic acid |

Monomer 1 $CH_2=C(CH_3)COOCH_2CH_2N(CH_3)_2CH_2CH(OH)CH_2Cl.NO_3$

The following quaternary ammonium monomers and quaternary ammonium latex polymers were prepared as disclosed in U.S. Pat. Nos. 3,702,799, and 3,678,098 and EPC Publication 0072158. All parts and percentages are by weight unless otherwise indicated.

EXAMPLE 1

(Preparation of Latex A)

A standard gradual addition emulsion polymerization was conducted in a 1 gallon reactor using a monomer emulsion mix consisting of 750 g $H_2O$, 167 g surfactant (Triton X-405 from Rohm and Haas Co.), 1892 g EA, and 58.5 g of Monomer 1.

A redox system was used which comprised 4.87 g t-butyl hydroperoxide/150 g $H_2O$ as catalyst and 4.87 g sodium sulfoxylate formaldehyde/150 g $H_2O$ as reducing agent. The monomer emulsion and initiator co-feeds were added separately and uniformly over a 3-hour period at 60° C. under a nitrogen atmosphere. The reactor had been previously charged with 750 g $H_2O$, 0.2 g $H_2SO_4$, and 45 g Fe(II) (15 wt. % aq. solution). At the end of the feeds the polymeriation was maintained at 60° C. for an additional ½ hour, then cooled to room temperature and filtered through a 325-mesh screen. The product was isolated as approximately 50% solids and identified as Latex A.

EXAMPLE 2

(Preparation of Latex B)

Latex B was prepared following the procedures given in Example 1 above, except that 78 g of phosphate ethoxylated esters (Gafac RE-960 from GAF Corp.) which had been neutralized to pH 5 with NaOH was used as the surfactant.

EXAMPLE 3

(Preparation of Latex C)

Latex C was prepared following the procedures given in Example 2 above, except that ammonium and sodium persulfate were used as polymerization catalyst, instead of t-butyl hydroperoxide.

EXAMPLE 4

Latex D was prepared following the procedures given in Example 1 above, except that 69 g of sodium dodecylbenzene sulfonate (Siponate DS-10 from Alcolac, Inc.) and 58.5 g ethoxylated aromatic sulfonate (Abex 26S from Alcolac, Inc.) were used as the surfactants.

EXAMPLE 5

Latex E was prepared following the procedures given in Example 1 above, except that 69 g sodium dodecylbenzene sulfonate (Siponate DS-10) was also added to the monomer emulsion mix.

EXAMPLE 6

The synthesis described in Example 1 was repeated, except that polymerization was at 80° C. using a conventional thermal "grad-add" process, and a total of 8.78 grams of ammonium and sodium persulfate as catalyst were used.

EXAMPLES 7-10

Following the procedures given in Example 1 above, various latex polymers were prepared which comprised the following:

|  | Polymer Composition |
|---|---|
| Ex. 7 | 50% EA/47% BA/3% Monomer 1 |
| Ex. 8 | 85% BA/12% MMA/3% Monomer 1 |
| Ex. 9 | 97% EA/3% Monomer 1 |
| Ex. 10 | 97% BA/3% Monomer 1 |

EXAMPLE 11

A polymer latex mixture was prepared by the sequential mixing of the following
(a) 100 parts of a latex polymer containing 97 parts EA and 3 parts Monomer 1 (prepared as in Example 1 above), and having a total solids of 50% by weight;
(b) 6 parts Genepoxy resin (emulsified diglycidyl ether of bisphenol A from Daubert Chemical);
(c) 8 parts of an amine-containing acrylic oligomer having the composition of 46 parts BA, 46 parts MMA and 8 parts AA post-animated with 13% ethylene diamine; this oligomer being prepared as taught in U.S. Pat. 4,120,839 and
(d) 1.2 parts of 2,4,6-tri(dimethylaminomethyl) phenol as an epoxy curing accelerator.

12 to 14 grams of the above latex mixture was poured into a 4 inch (10 cm) diameter polystyrene petri dish and was dried at room temperature (25° C.) for 3 to 4 days before test. A tensile tester with a crosshead speed of 5 cm per minute was used to test the film strength. Film from a control emulsion without additive (b), (c) and (d) was prepared similarly. The film from the latex mixture containing epoxy and amine additives gave a maximum strength of >300 lbs./sq. inch (>21 kg/cm$^2$) while that of the control latex without the epoxy and amine additives only gave 100 lbs. sq. inch (7.03 kg/cm$^2$).

EXAMPLES 12-23

Examples 12-23 illustrate the composition of the first component of the two-part compositions according to this invention. The formulations for Examples 12-23 are shown in Table I below.

TABLE I

| Ingredients | 12 | 13 | 14 | 15 | 16 | 17 | 18 | 19 | 20 | 21 | 22 | 23 |
|---|---|---|---|---|---|---|---|---|---|---|---|---|
| Latex A* | 100 | 100 |  |  |  |  |  |  | 100 |  |  |  |
| Latex B* |  |  |  |  |  |  |  |  |  | 100 | 100 | 100 |
| Latex F* |  |  | 100 | 100 |  |  |  |  |  |  |  |  |
| Latex G* |  |  |  |  | 100 | 100 |  |  |  |  |  |  |
| Latex H* |  |  |  |  |  |  | 100 | 100 |  |  |  |  |
| Genepoxy* resin |  | 12 |  | 6 |  | 10 |  | 10 | 2 |  | 2 | 1 |

*Latex A was prepared in Example 1.
*Latex B was prepared in Example 2.
*Latex F was prepared from a monomer composition of 97 parts BA and 3 parts Monomer 1 (as described in Example 2) and having a total solids of 60%.
*Latex G was prepared from a monomer composition of 47 parts EA, 49 parts AN, and 3 parts Monomer 1 (as described in Example 2), and having a total solids of 55%.
*Latex H was prepared from a monomer composition of 48 parts EA, 49 parts MMA and 3 parts Monomer 1 (as described in Example 1), and having a total solids of 50%.
*Genepoxy resin is emulsified diglycidyl ether of bisphenol A.

EXAMPLES 24-34

Examples 24-34 illustrate the composition of the second component of the two-part compositions according to the present invention. The formulations for Examples 24-34 are shown in Table II below.

TABLE II

| Ingredients | 24 | 25 | 26 | 27 | 28 | 29 | 30 | 31 | 32 | 33 | 34 |
|---|---|---|---|---|---|---|---|---|---|---|---|
| Resin A[1] |  | 8 | 8 | 7 | 6.3. | 5 |  | 5 | 1 |  |  |
| DMP-30[2] |  | 1 | 1.2 | 1 | 1 |  | 0.6 | 0.6 | 0.4 |  |  |
| Cat. F[3] | 4 |  |  |  |  |  |  |  |  |  |  |
| D-400[4] |  |  |  |  |  |  |  |  |  | 0.5 |  |
| D-230[4] |  |  |  |  |  |  |  |  |  |  | 0.5 |

[1]Amino functional acrylic oligomer as described in Example 11. The total solids are 50%.
[2]DMP-30 is tri-(dimethylaminomethyl) phenol manufactured by Rohm and Haas Company.
[3]Cat. F is a 15% aqueous solution of equal molar mixture of sodium carbonate and sodium bicarbonate.
[4]D-400 and D-230 are the polyoxypropylene amines manufactured by Jefferson Chemical.

The following examples further illustrate this invention by preparation of blends of the first and second components prepared in Examples 12-34 above.

Unless otherwise indicated, the blends below consist of 1:1 by weight blends of first component to second component.

EXAMMPLE 35

Free films were cast from a blend of the first component from Example 13 and the second component from Example 25. 12-14 grams of the blend were poured into a 4 inch diameter Nalgene plastic dish and dried at room temperature for 3 to 4 days before test. A tensile tester with cross head speed of 5 cm. per minute was used to test the film strength. Films fr, a control polymer blend without amine and epoxy additives (blend of first component from Example 12 and second component from Example 24) were also prepared. The control showed a maximum film strength of 23 lbs/sq. inch (1.62 Kg/cm$^2$) while the film from the emulsion polymer with both the amine and epoxy additives (blend of Example 13 and Example 25) gave a maximum strength of 115 lbs/sq. inch (8.09 Kg/cm$^2$).

EXAMPLE 36

A blend was prepared using the first component from Example 15 and the second component from Example 26 and tested for adhesive shear strength.

In testing adhesive shear strength, 6"×1"×0.063" (15.2 cm×2.5 cm×0.16 cm) aluminum coupons (2024T3 Alclad from Q-panel Company) were used. Samples of the blend were brushed on the aluminum coupons and dried at room temperature for 1 hour. Two adhesive-coated coupons were bonded with one square inch overlap and pressed together at 100 lbs/sq. inch (7.03 Kg/sq. cm) for 20 seconds. The aluminum laminates were aged for 3 to 4 days before test. Laminates made from a control polymer blend without apoxy and amine additives blend of first component from Example 14 and second component from Example 24) had a shear strength of 12 lbs/in² (0.84 Kg/cm²). Laminates made from the polymer blend with both the epoxy and amine additives (blend of Example 15 and Example 26) had a shear strength of 122 lbs/in² (8.58 Kg/cm²).

EXAMPLE 37

The experiment in Example 36 was repeated except the lamininates were heat-cured at 180° F. (82° C.) for 2 hours instead of being used at room temperature. Laminates bonded with the control blend had a shear strength of 41 lbs/in² (2.88 Kg/cm²) while laminates bonded with composition of the current invention had a shear strength of 190 lbs/in² (13.4 Kg/cm²).

EXAMPLE 38

Free films from polymer blends were prepared the same way as in Example 35 and were tested by a tensile tester at 5 cm per minute. Maximum film strength for the control blend prepared from the first component of Example 16 and the second component from Example 24 was 84 lbs/in² (5.91 Kg/cm²). Maximum film strength for the composition of this invention (blend of first component from Example 17 and second component from Example 25) was greater than 300 lbs/in² (21.1 Kg/cm²).

EXAMPLE 39

Thin cotton webs were coated with emulsion polymer binder by first passing through a feeding pan containing the liquid binder and then the excess binder on the web was removed by pressing at 30 lbs/in² (2.1 Kg/cm²) through a two roller coater. After drying at room temperature for one day, the webs were cut into 1 inch×1 inch (2.54 cm×2.54 cm) size and were put into a washer together with 6 regular size bath towels. The washer cycle was set at hot wash and warm rinse. After each wash cycle, the webs were examined for integrity. Webs impregnated with 1:1 water dilution of a control blend of the first component from Example 16 and second component from Example 24 completely disintegrated after one wash cycle. Webs impregnated with 1:1 water dilution of a blend of first component from Example 17 and second component from Example 27 passed at least two wash cycles.

EXAMPLE 40

To test impact strength samples of the polymer latex were coated on 4"×1"×0.025" (10.2 cm×2.54 cm×0.064 cm) steel panels (Bonderite steel 1000 from Parker Company) at a dry film thickness of 3 mil (0.0076 cm). The resin-coated panels were dried for 11 days at room temperature before testing for impact strength. The results are shown in Table III below:

TABLE III

| Sample | Coating Material Used | Reverse Impact Strength (inch-pounds) |
| --- | --- | --- |
| 1 | Control Emulsion (blend of Ex. 18 and Ex. 24) | 0 (film completely cracked after drying) |
| 2 | Control Emulsion plus amine (blend of Ex. 18 and Ex. 29) | 5 |
| 3 | Control Emulsion plus epoxy (blend of Ex. 19 and Ex. 30) | 10 |

TABLE III-continued

| Sample | Coating Material Used | Reverse Impact Strength (inch-pounds) |
| --- | --- | --- |
| 4 | Present Invention: Control emulsion, amine and epoxy (blend of Ex. 19 and Ex. 31) | >40 |

The above table clearly shows that only the composition of the current invention (Sample 4 above) gave a dramatic improvement in reverse impact strength.

EXAMPLE 41

In testing the heat and humidity resistance of the polymer emulsions, 4 inch×4 inch (10.2 cm×10.2 cm) rigid polystyrene sheets were sprayed with the polymer emulsions and dried at room temperature for one hour or at 180° F. for 3 to 5 minutes. Flexible polyurethane foams were then pressed on the adhesive-coated polystyrene sheets at 20 lbs/in² (1.41 Kg/g cm²) for 5 seconds. The finished laminates were aged for one day at room temperature and then subjected to environmental testing: one hour at 100° F. (38° C.) and 100% relative humidity. Immediately after the environmental aging, the polyurethane foam was peeled off from the polystyrene sheet and the percentage foam tear is estimated. Laminates bonded with a control emulsion (blend of first component from Example 12 and second component from Example 24) showed less than 50% foam tear. Laminates bonded with the emulsion containing epoxy and amine additives (blend of first component from Example 20 and second component from Example 32) showed greater than 85% foam tear, which demonstrate improved adhesion in an environment of heat and humidity.

EXAMPLE 42

The following example demonstrates an alternative composition of this invention, namely a one part binder, coating and adhesive composition. It consists of the acidic mixture of the quaternary ammonium group-containing polymer latex, amine and epoxy. A blend (1:1 by weight) of components prepared in Example 23 and Example 24 was pH adjusted to 3.0–4.0 by addition of HCl. This acidic blend mixture was heat-aged at 50° C. for 11 days before activation by base. An 8 % aqueous solution of sodium hydroxide was used to adjust pH of the heat-aged blend to 9.0. The base-activated emulsion was then used to bond polyurethane foam to polystyrene board as described in Example 41. The laminates showed excellent heat and humidity resistance: greater than 70% foam tear, after 24 hours age at 100° F. (38° C.) and 100% relative humidity.

I claim:
1. An improved aqueous coating or adhesive composition essentially comprising in combination
(1) an aqueous dispersion of an alkaline-curable, thermosetting latex polymer prepared by emulsion polymerization and containing pendant or terminal quaternary ammonium groups selected from the group consisting of the formula

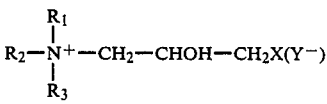

and

-continued

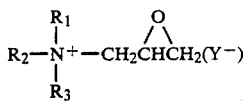

wherein $R_1$ is an ethylenically unsaturated organic group; $R_2$ and $R_3$ independantly are $C_1$-$C_6$ alkyl groups; X is Cl, Br, I, or functionally equivalent group; and Y is an anion;

(2) at least one epoxy compound having two or more epoxy groups per molecule; and (3) amine-functional epoxy curing agent.

2. An improved aqueous coating or adhesive composition according to claim 1 wherein the pH of said composition is less than 7.

3. A two-part binder, coating or adhesive composition having as separate components a first component comprising (1) an aqueous dispersion of an alkaline-curable, thermosetting latex polymer prepared by emulsion polymerization and containing quarternary ammonium groups selected from the group consisting of of the formula

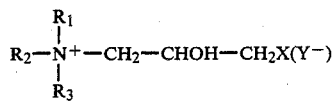

and

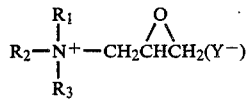

wherein $R_1$ is an ethylenically unsaturated organic group; $R_2$ and $R_3$ independently are $C_1$-$C_6$ alkyl groups; X is Cl, Br, I or functionally equivalent group; and Y is an anion; and (2) at least one epoxy compound having two or more epoxy groups per molecule; and a second component comprising amine-functional epoxy curing agent, an organic base which contains no amine functional groups, or an inorganic base, or a mixture thereof;

wherein the pH of the resulting mixture of said first and second components is greater than about 6.

4. A composition according to claim 3 wherein said first component additionally contains an aqueous dispersion of a carboxylic acid latex polymer prepared by emulsion polymerization of at least one monomer having pendant carboxylic acid groups.

5. A composition according to claim 1 wherein $R_1$ is

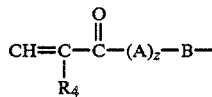

where A is —O—, —NH—, or —N(CH$_3$)— with z being 0 or 1; B is —(CH$_2$)$_n$— with n being 2 to 4, or a polyoxyalkylene group of the formula —(CH$_2$CH$_2$O)$_x$CH$_2$CH$_2$— with x being 1 to 11; and $R_4$ is —H or —CH$_3$.

6. A composition according to claim 1 wherein $R_1$ is

where $R_5$ is (1) alkenoxy group containing an allyl group or (2) a carbalkenoxy group containing a double bond functionally equivalent to an isolated vinyl group; $R_6$ is —H or —OH; and n is 0 or 1.

7. A composition according to claim 1 wherein $R_1$ is

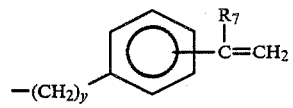

where $R_7$ is —H or CH$_3$ and y is 1 to 4.

8. A composition according to claim 1 wherein Y is selected from the group consisting of halogen, nitrate, phosphate, acid phosphate, sulfate, bisulfate, methyl sulfate, carboxylate, sulfonate, sulfamate, acetate, formate, oxalate, acrylate and α-methacryloxyacetate.

9. A composition according to claim 8 wherein Y is the anion of an acid having an ionization constant (pKa) of 5.0 or less.

10. A composition according to claim 3 wherein $R_1$ is

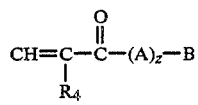

where A is —O—, —NH—, or —N(CH$_3$)— with z being 0 or 1; B is —(CH$_2$)$_n$— with n being 2 to 4, or a polyoxyalkylene group of the formula —(CH$_2$CH$_2$O)$_x$CH$_2$CH$_2$— with x being 1 to 11; and $R_4$ is —H or —CH$_3$.

11. A composition according to claim 1 wherein $R_1$ is

where $R_5$ is (1) an alkenoxy group containing an allyl group or (2) a carbalkenoxy group containing a double bond functionally equivalent to an isolated vinyl group; $R_6$ is —H or —OH; and n is 0 or 1.

12. A composition according to claim 3 wherein $R_1$ is

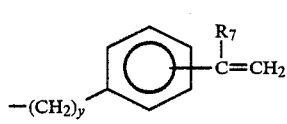

where $R_7$ is —H or —CH$_3$ and y is 1 to 4.

13. A composition according to claim 3 wherein Y is selected from the group consisting of halogen, nitrate, phosphate, acid phosphate, sulfate, bisulfate, methyl sulfate, carboxylate, sulfonate, sulfamate, acetate formate, oxalate, acrylate and α-methacryloxyacetate.

14. A composition of claim 13 wherein Y is the anion of an acid having an ionization constant (pKa) of 5.0 or less.

15. A composition of claim 1 wherein said latex polymer is prepared by reacting epihalohydrin with a polymer containing an amine of the formula

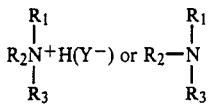

where $R_1$ is an ethylenically unsaturated organic group; $R_2$ and $R_3$ independently are $C_1-C_6$ alkyl groups; and Y is an anion.

16. A composition of claim 1 which optionally contains additives selected from the group consisting of fillers, thickeners, pigments, dyes, metals, plasticizers, solvents, defoamers, tackifiers, stabilizers, antioxidants, preservatives, rheological modifiers, and corrosion inhibitors.

17. A composition of claim 3 wherein said first component optionally contains additives selected from the group consisting of fillers, thickeners, pigments, dyes, metals, plasticizers, solvents, defoamers, tackifiers, stabilizers, antioxidants, preservatives, rheological modifiers, and corrosion inhibitors.

18. A composition of claim 1 which optionally contain an epoxy cure accelerator.

19. A composition of claim 3 wherein said second component optionally contains an epoxy cure accelerator.

20. A composition of claim 18 wherein said epoxy cure accelerator is selected from the group consisting of tri-(dimethylaminoethyl-phenol, dimethylamino phenol, and aminoethyl piperazine.

21. A composition of claim 19 wherein said epoxy cure accelerator is selected from the group consisting of tri-(dimethylaminoethyl)-phenol, dimethylamino phenol, and aminoethyl piperazine.

22. A composition of claim 1 wherein said alkaline-curable latex polymer is emulsion polymerized from copolymerizable monomers containing from about 0.1 to about 5% by weight carboxylic acid monomer based on total monomer.

23. A composition of claim 3 wherein said alkaline-curable latex polymer is emulsion polymerized from copolymerizable monomers containing from about 0.1 to about 5% by weight carboxylic acid monomer based on total monomer.

24. A composition of claim 22 wherein said carboxylic acid monomer is selected from the group consisting of acrylic acid, methacrylic acid, itaconic acid, crontonic acid, maleic acid, fumaric acid, beta-acryloxypropionic acid, and mixtures thereof.

25. A composition of claim 23 wherein said carboxylic acid monomer is selected from the group consisting of acrylic acid, methacrylic acid, itaconic acid, crotonic acid, maleic acid, fumaric acid, beta-acryloxypropionic acid, and mixtures thereof.

26. A composition of claim 1 wherein said epoxy compound is selected from the group consisting of reaction products of bisphenol A and epichlorohydrin, reaction products of bisphenol F and epichlorohydrin, epoxidized novolac resins, reaction products of epichlorohydrin and aliphatic polyols, and mixtures thereof; and the amount of said epoxy compound ranges from about 0.1% to about 50% by weight based on the total dry weight of latex polymer.

27. A composition of claim 3 wherein said epoxy compound is selected from the group consisting of reaction products of bisphenol A and epichlorohydrin, reaction products of bisphenol F and epichlorohydrin, epoxidized novolac resins, reaction products of epichlorohydrin and aliphatic polyols, and mixtures thereof; and the amount of said epoxy compound ranges from about 0.1% to about 50% by weight based on the total dry weight of latex polymer.

28. A composition of claim 1 wherein said amine-functional epoxy curing agent is selected from the group consisting of ethylene diamine, triethylene tetraamine, diethylene triamine, polyoxypropylene amines, amine-functional acrylic resins, isophorone diamine, and tetraethylene pentamine.

29. A composition of claim 3 wherein said amine-functional epoxy curing agent is selected from the group consisting of ethylene diamine, triethylene tetraamine, diethylene triamine, polyoxypropylenen amines, amine-functional acrylinc resins, isophorone diamine, and tetraethylene pentamine.

* * * * *